(12) United States Patent  
Hampiholi et al.

(10) Patent No.: US 9,165,371 B2
(45) Date of Patent: Oct. 20, 2015

(54) USER LOCATION SYSTEM

(71) Applicant: Harman International Industries, Incorporated, Stamford, CT (US)

(72) Inventors: Vallabha Vasant Hampiholi, Bangalore (IN); Ravi Lakkundi, Bangalore (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 201 days.

(21) Appl. No.: 13/838,137

(22) Filed: Mar. 15, 2013

(65) Prior Publication Data

US 2014/0270357 A1    Sep. 18, 2014

(30) Foreign Application Priority Data

Dec. 24, 2012  (IN) .......................... 5403/CHE/2012

(51) Int. Cl.
*G06K 9/00* (2006.01)
*G06T 7/00* (2006.01)
*B60R 21/16* (2006.01)

(52) U.S. Cl.
CPC ............. *G06T 7/0085* (2013.01); *G06T 7/0042* (2013.01); *G06T 2207/30196* (2013.01); *G06T 2207/30268* (2013.01)

(58) Field of Classification Search
USPC ......... 382/100, 103–107, 154, 157, 162, 168, 382/173, 181, 199, 206, 209, 224, 232, 243, 382/254, 274, 276, 285–295, 305, 312, 382/225; 280/735; 455/418

See application file for complete search history.

(56) References Cited

U.S. PATENT DOCUMENTS

| | | | | |
|---|---|---|---|---|
| 4,625,329 A | * | 11/1986 | Ishikawa et al. | ............. 382/104 |
| 7,887,089 B2 | * | 2/2011 | Breed et al. | .................. 280/735 |
| 2003/0118245 A1 | * | 6/2003 | Yaroslavsky et al. | ......... 382/255 |
| 2005/0201591 A1 | * | 9/2005 | Kiselewich | ................... 382/104 |
| 2008/0051957 A1 | | 2/2008 | Breed et al. | |
| 2009/0214081 A1 | | 8/2009 | Nakano et al. | |
| 2012/0214463 A1 | * | 8/2012 | Smith et al. | ................... 455/418 |

OTHER PUBLICATIONS

International Search Report for PCT/US2013/077706, Aug. 22, 2014.

* cited by examiner

*Primary Examiner* — Seyed Azarian
(74) *Attorney, Agent, or Firm* — Artegis Law Group, LLP (57) ABSTRACT

A user location system (ULS) can use images, such as video or still images, captured from at least one camera of an electronic device, such as a mobile device, to determine, via at least edge detection and image uniformity analysis, location of a user in an environment, such as in a cabin of a vehicle. The determined location of the user can then be used as an input to control at least one aspect of the environment. In the case of a vehicle, such input may be used to facilitate control of speed, safety features, climate, and/or audio playback, for example.

20 Claims, 4 Drawing Sheets

USER LOCATION SYSTEM

PRIORITY CLAIM

This application claims the benefit of priority from Indian Provisional Patent Application No. 5403/CHE/2012, filed Dec. 24, 2012, which is incorporated by reference.

BACKGROUND OF THE INVENTION

1. Technical Field

The present disclosure relates to user location systems that locate users of electronic devices, such as mobile devices, based at least on mobile device captured images.

2. Related Art

A user location system (ULS) can use images of a user of an electronic device to determine the location of the user in a known environment. For example, a ULS, such as a mobile ULS, may be used to locate mobile device users in an environment, such as inside a vehicle. In one known example, a ULS can use an image captured by a mobile device of a passenger, to determine whether the passenger is a driver of a vehicle.

SUMMARY

A user location system (ULS) can use an image, such as a video or still image, captured from a camera of an electronic device to determine, via at least edge detection and image uniformity analysis, location of a user in an environment such as a vehicle cabin. The determined location of the user can be used as an input to a control of an aspect of the environment, such as a climate control or a stereo system control in a vehicle cabin.

In one example, the determination of the location of the user may include determining the location from one or more images captured by a front- and/or a rear-facing camera of a mobile device such as a smart phone. The determination may also include processing of the one or more images. The processing may include image noise removal, image enhancement, histogram equalization, object edge detection, image uniformity analysis, and/or image brightness analysis. Also, in an example, the processing may also include image quadrant analysis.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system, such as a user location system (ULS), may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

It is to be understood that the following description of examples of implementations are given only for the purpose of illustration and are not to be taken in a limiting sense. The partitioning of examples in function blocks, modules or units illustrated in the drawings is not to be construed as indicating that these function blocks, modules or units are necessarily implemented as physically separate devices or a single physical device. Functional blocks, modules or units illustrated or described may be implemented as separate devices, circuits, chips, functions, modules, or circuit elements. One or more functional blocks, modules, or units may also be implemented in a common circuit, chip, circuit element or device.

Described herein is a user location system (ULS) that can use data captured from at least one camera of an electronic device, to determine, via at least edge detection and image uniformity analysis, location of a user in an environment such as a living space or a cabin of a vehicle. The determined location of the user in the environment can then be used as an input to a control of one or more aspects of the environment, such as a climate control or a stereo system control, for example.

In one example, the ULS can use images captured, such as video or still images, from at least one camera of a mobile device such as a smartphone, to determine a location of a user of the mobile device, such as a seat position of the user in a vehicle. The determined location of the user can then be used as an input to the control of one or more aspects of an environment of the user, such as controlling one more aspects of an environment inside a vehicle. This control may include, for example, a speed control, a climate control, or a stereo system control of a vehicle. It may also include a safety system control, such as a control of one or more airbags, seat belts, or brake systems.

In such an example, the determination of the location of the user may include determining the location from one or more images captured by a front- and/or a rear-facing camera of the mobile device. The determination may also include processing of the one or more images. The processing may include image noise removal, image enhancement, histogram equalization, object edge detection, image uniformity analysis, and/or image brightness analysis. Alternatively, or in addition, the processing may include image quadrant analysis.

With respect to a mobile device with multiple cameras, a front-facing camera may be embedded on a front-side of the mobile device, and a rear-facing camera may be embedded on the rear-side of the mobile device. The front-side of the mobile device may include a user interface of the mobile device. The user interface may include a display, a keypad, touchscreen, any interface operable to receive user input including voice, touch, retinal movement, or gestures, or any combination thereof.

In another example, the ULS may include one or more cameras operable to capture one or more images of a user of an electronic device in an environment, such as passenger using a mobile device in a vehicle. The ULS also may include a processor and processor executable instructions stored in memory that are executable by the processor to determine an edge density and an edge density location in the image(s).

The instructions may also be executable by the processor to determine a location of the user with respect to left and right positions in the environment (such as left, middle, and right seats in a vehicle) based at least on the determined edge density and the edge density location. For example, in a vehicle cabin, an image taken of and/or from a left side of a vehicle cabin may include a greater edge density on the left side of the image. Therefore, the ULS may determine that the user holding the device that captured the image is on the left side of the cabin.

Edge density may be an amount of edges per unit of area. Edge density location may be a location or a region of an image where edge density is the highest or is greater than a threshold edge density value. A region of an image may be amorphous or a shaped section, such as a rectangular section. For example, the edge density location may be a top, bottom, left, or right half of a rectangular image. In another example, the edge density location may be a top-left, top-right, bottom-left, or bottom-right quarter of a rectangular image.

The instructions may also be executable by the processor to determine uniformity of the captured image(s) using an entropy calculation and/or a transformation of the image(s) from a spatial domain to a frequency domain. The instructions may also be executable to determine location of the user with respect to front and rear positions in the environment (such as front, middle, and rear seats in a vehicle) based at least on the determined uniformity of the captured image(s). In determining the uniformity of the captured image(s), the entropy calculation may be a statistical measurement of randomness in the captured image(s). This information may be used to characterize image texture in the captured image(s). An image that is homogenous, for example, may be characterized or determined to be a stationary or memoryless source. Pixels of such an image may have similar attributes, and the image may have an equiprobable histogram distribution.

The ULS also may include an interface operable to output to a control device of the user's environment, the determined location of the user with respect to the left and/or right positions and the front and/or the rear positions. The left and right positions and the front and rear positions may represent respective left-front, left-rear, right-front, and right-rear seat positions of a vehicle or living space. In addition or alternatively, the interface may output relative positions, designated or known positions (such as seats), and/or coordinates, such as x-y coordinates.

In another example, the ULS may include or communicate with a mobile device of a user. The mobile device may include a front-facing camera operable to capture a front-facing image of the user and a rear-facing camera operable to capture a rear-facing image of an environment in front of the user when the front-facing camera is facing the user. The mobile device may also include processor executable instructions stored in memory executable to make several determinations regarding location of the user based on the front- and rear-facing images. Alternatively, the mobile device may communicate information associated with front- and rear-facing images, to the system, so that the system can make the several determinations regarding location of the user based on the front- and rear-facing images.

For example, the processor may determine an edge density and an edge density location in the front-facing image, as described later. The processor may also determine location of the user with respect to left and/or right positions based at least on the determined edge density and the edge density location. The processor may also determine uniformity of the front-facing image using an entropy calculation and/or a transformation of the front-facing image from a spatial domain to a frequency domain, as described later. Also, the processor may determine location of the user with respect to front and/or rear positions based at least on the determined uniformity of the front-facing image. Finally, the processor may confirm the location of the user with respect to the front and/or rear positions based at least on brightness of the rear-facing image.

In yet another example, the ULS also may include a processor that makes other determinations. For example, the processor may determine one or more irregularities in the captured image(s). The processor may also determine an edge density based at least on the determined one or more irregularities, or vice versa. The processor may also determine location of the edge density. The processor may also determine location of the user in the environment with respect to left and/or right positions based at least on the determined location of the edge density. In this example, the determination of the location of the edge density may be based at least on the determined one or more irregularities and/or on image segmentation. These determinations of the one or more irregularities and the edge density may be made via an edge detection calculation, such as a Sobel operation, Canny edge detection, Roberts edge detection, and/or Prewitt edge detection.

The processor may also remove noise from the captured image(s). Example noise removal modules may include a smoothing filter. Such a filter may include convolving the captured image(s) with a mask that includes low-pass filter. Also, the low-pass filter may be designed to limit edge erosion. Although low-pass filters may be designed with edge preservation aspects, the ULS may utilize example image enhancements techniques and modules to fill-in or emphasize edges.

One example of image enhancement includes identifying neighboring pixels proximate to edges, and then determining discontinuities in color or brightness, for example, between the neighboring pixels. Where the discontinuities are determined, the image enhancement module may proceed with changing color and/or brightness of pixels within the discontinuities.

In addition or alternatively, image enhancement may include histogram equalization. A histogram equalization technique or module may be useful when a target environment of the user may have varying light conditions. For example, a vehicle cabin may have varying light conditions or intensities. In a vehicle cabin, images captured in a front seat may be brighter or have more contrast due to brighter lighting conditions, than images captured in a rear seat. In such scenarios for example, histogram equalization may enhance contrast in the captured image(s). Enhancement in contrast to the captured image(s) may occur by varying pixel brightness near edges, for example.

The processor may also determine whether a captured image of the captured image(s) is captured by a rear-facing camera, where the camera(s) include a front-facing camera and the rear-facing camera. In such an example, the processor may analyze, with respect to brightness, the histogram of the histogram equalization, in response to determining the captured image is captured by the rear-facing camera. Then the processor may confirm the determined location of the user in the environment with respect to the front and rear positions based at least on the analysis of the histogram. For example, in a case where the environment is a vehicle cabin, a brightness value determined from the analysis that is greater than a brightness threshold may confirm that the user is in a front seat of the cabin. In daylight conditions, in general, a front seat of a vehicle cabin may be brighter than a back seat of the cabin.

As described, the processor may also transform the captured image(s) from a spatial domain to a frequency domain. The transformation may use various mathematical and signal processing transforms, such as various Fourier Transforms and Wavelet Transforms. The determination of the uniformity of the captured image(s) may be based at least on the transformed image(s). Also, the determination of the uniformity of the captured image(s) may be based at least on an amount of frequency domain coefficients of the transformed image(s) over a threshold. This and any other threshold described herein may be calibrated periodically during running of an example ULS, or during activation of an example ULS.

The processor may also segment the captured image(s) into blocks; and analyze the blocks. Each block may include one or more pixels. The determination of the uniformity of the captured image(s) may be based at least on a difference analysis of the blocks. The difference analysis of the blocks may be based at least on a calculated entropy of the blocks, where the entropy of the blocks may be based on one or more differences with neighboring blocks. In other words, the analysis may also be based at least on homogeneity of the blocks.

Figure 1:
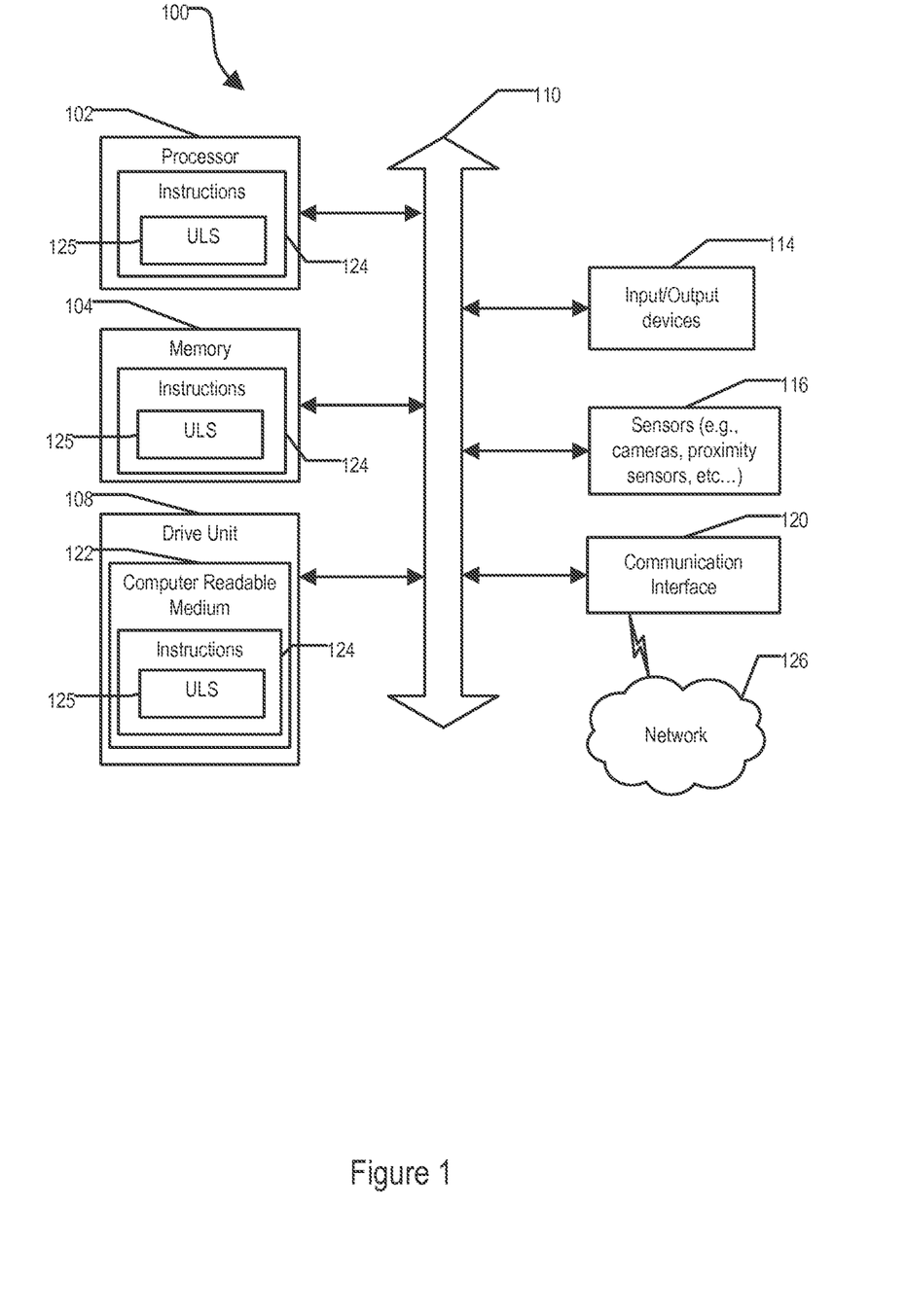
FIG. 1 illustrates a block diagram of an example electronic device that may include one or more aspects of an example ULS.

FIG. 1 is a block diagram of an example electronic device 100 that may include one or more aspects or modules of an example ULS. The electronic device 100 may include a set of instructions that can be executed to cause the electronic device 100 to perform any of the methods and/or computer based functions disclosed herein, such as locating objects and/or people in a target environment, such as inside a vehicle, and changing one or more aspects of the target environment based at least on information associated with the location of the objects and/or people. The one or more aspects of the target environment may include audio output signals and/or climate, for example. The locating of objects and/or people in a target environment may also cause other control devices to take other actions. For example, the object/person location information provided to a control device may cause the control device to increase, decrease, or maintain a mechanical operation coupled to the control device. For example, such information may cause an information system of a vehicle to accelerate or decelerate the vehicle. The electronic device 100 may operate as a standalone device, may be included in as functionality within a device also performing other functionality, or may be connected, such as using a network, to other computer systems, devices, or peripheral devices.

In the example of a networked deployment, the electronic device 100 may operate in the capacity of a server or as a client user computer in a server-client user network environment, as a peer computer system in a peer-to-peer (or distributed) network environment, or in various other ways. The electronic device 100 can also be implemented as, or incorporated into, various electronic devices, such as hand-held devices such as smartphones and tablet computers, portable media devices such as recording, playing, and gaming devices, automotive electronics such as head units and navigation systems, or any other machine capable of executing a set of instructions (sequential or otherwise) that result in actions to be taken by that machine. The electronic device 100 may be implemented using electronic devices that provide voice, audio, video and/or data communication. While a single electronic device 100 is illustrated, the term "device" may include any collection of devices or sub-devices that individually or jointly execute a set, or multiple sets, of instructions to perform one or more functions. The one or more functions may include locating objects and/or people in a target environment, such as inside a vehicle, and changing one or more aspects of the environment, such as audio output signals, based at least on information associated with the location of the objects and/or people.

The electronic device 100 may include a processor 102, such as a central processing unit (CPU), a graphics processing unit (GPU), or both. The processor 102 may be a component in a variety of systems. For example, the processor 102 may be part of a head unit in a vehicle. Also, the processor 102 may include one or more general processors, digital signal processors, application specific integrated circuits, field programmable gate arrays, servers, networks, digital circuits, analog circuits, combinations thereof, or other now known or later developed devices for analyzing and processing data. The processor 102 may implement a software program, such as code generated manually or programmed.

The electronic device 100 may include memory, such as a memory 104 that can communicate via a bus 110. The memory 104 may be or include a main memory, a static memory, or a dynamic memory. The memory 104 may include any non-transitory memory device. The memory 104 may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media and the like. Also, the memory may include a non-transitory tangible medium upon which software may be stored. The software may be electronically stored as an image or in another format (such as through an optical scan), then compiled, or interpreted or otherwise processed.

In one example, the memory 104 may include a cache or random access memory for the processor 102. In alternative examples, the memory 104 may be separate from the processor 102, such as a cache memory of a processor, the system memory, or other memory. The memory 104 may be or include an external storage device or database for storing data. Examples include a hard drive, compact disc (CD), digital video disc (DVD), memory card, memory stick, floppy disc, universal serial bus (USB) memory device, or any other device operative to store data. For example, the electronic device 100 may also include a disk or optical drive unit 108. The drive unit 108 may include a computer-readable medium 122 in which one or more sets of software or instructions, such as the instructions 124, can be embedded. The processor 102 and the memory 104 may also include a computer-readable storage medium with instructions or software.

The memory 104 may be operable to store instructions executable by the processor 102. The functions, acts or tasks illustrated in the figures or described may be performed by the programmed processor 102 executing the instructions stored in the memory 104. The functions, acts or tasks may be independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

The instructions 124 may include the methods and/or logic described herein, including aspects or modules of the electronic device 100 and/or an example user location system (such as ULS module 125). The instructions 124 may reside completely, or partially, in the memory 104 or in the processor 102 during execution by the electronic device 100. For example, software aspects or modules of the ULS (such as the ULS module 125) may include examples of various image signal processors that may reside completely, or partially, in the memory 104 or in the processor 102 during execution by the electronic device 100.

With respect to various signal processors that may be used by the ULS, hardware or software implementations of such processors may include analog and/or digital signal processing modules (and analog-to-digital and/or digital-to-analog converters). The analog signal processing modules may include linear electronic circuits such as passive filters, active filters, additive mixers, integrators and delay lines. Analog processing modules may also include non-linear circuits such as compandors, multiplicators (frequency mixers and voltage-controlled amplifiers), voltage-controlled filters, voltage-controlled oscillators and phase-locked loops. The digital or discrete signal processing modules may include sample and hold circuits, analog time-division multiplexers, analog delay lines and analog feedback shift registers, for example. In other implementations, the digital signal processing modules may include ASICs, field-programmable gate arrays or specialized digital signal processors (DSP chips). Either way, such digital signal processing modules may enhance an image signal via arithmetical operations that include fixed-point and floating-point, real-valued and complex-valued, multiplication, and/or addition. Other operations may be supported by circular buffers and/or look-up tables. Such operations may include Fast Fourier transform (FFT), finite impulse response (FIR) filter, Infinite impulse response (IIR) filter, and/or adaptive filters such as the Wiener and Kalman filters. Also, other operations utilized by the ULS are described with respect to aspects of FIGS. 2-4.

The modules described herein may include software, hardware, firmware, or some combination thereof executable by a processor, such as processor 102. Software modules may include instructions stored in memory, such as memory 104, or another memory device, that may be executable by the processor 102 or other processor. Hardware modules may include various devices, components, circuits, gates, circuit boards, and the like that are executable, directed, or controlled for performance by the processor 102. The term "module" may include a plurality of executable modules.

Further, the electronic device 100 may include a computer-readable medium that includes the instructions 124 or receives and executes the instructions 124 responsive to a propagated signal so that a device connected to a network 126 can communicate voice, video, audio, images or any other data over the network 126. The instructions 124 may be transmitted or received over the network 126 via a communication port or interface 120, or using a bus 110. The communication port or interface 120 may be a part of the processor 102 or may be a separate component. The communication port or interface 120 may be created in software or may be a physical connection in hardware. The communication port or interface 120 may be configured to connect with the network 126, external media, one or more input/output devices 114, one or more sensors 116, or any other components in the electronic device 100, or combinations thereof. The connection with the network 126 may be a physical connection, such as a wired Ethernet connection or may be established wirelessly. The additional connections with other components of the electronic device 100 may be physical connections or may be established wirelessly. The network 126 may alternatively be directly connected to the bus 110.

The network 126 may include wired networks, wireless networks, Ethernet AVB networks, a CAN bus, a MOST bus, or combinations thereof. The wireless network may be or include a cellular telephone network, an 802.11, 802.16, 802.20, 802.1Q or WiMax network. The wireless network may also include a wireless LAN, implemented via WI-FI or BLUETOOTH technologies. Further, the network 126 may be or include a public network, such as the Internet, a private network, such as an intranet, or combinations thereof, and may utilize a variety of networking protocols now available or later developed including TCP/IP based networking protocols. One or more components of the electronic device 100 may communicate with each other by or through the network 126.

The one or more input/output devices 114 may be configured to allow a user to interact with any of the components of the electronic device. The one or more input/out devices 114 may include a keypad, a keyboard, a cursor control device, such as a mouse, or a joystick. Also, the one or more input/out devices 114 may include a microphone, one or more visual displays, speakers, remote controls, touchscreen displays or any other devices operative to interact with the electronic device 100, such as any device operative to act as an interface between the electronic device and one or more users and/or other electronic devices.

The electronic device 100 may also include one or more sensors 116. The one or more sensors 116 may include one or more proximity sensors, motion sensors, or cameras (such as front- and rear-facing cameras embedded in mobile devices). Functionally, the one or more sensors 116 may include one or more sensors that detect or measure, motion, temperature, magnetic fields, gravity, humidity, moisture, vibration, pressure, electrical fields, sound, or other physical aspects associated with a potential user or an environment proximate to the user.

Figure 2:
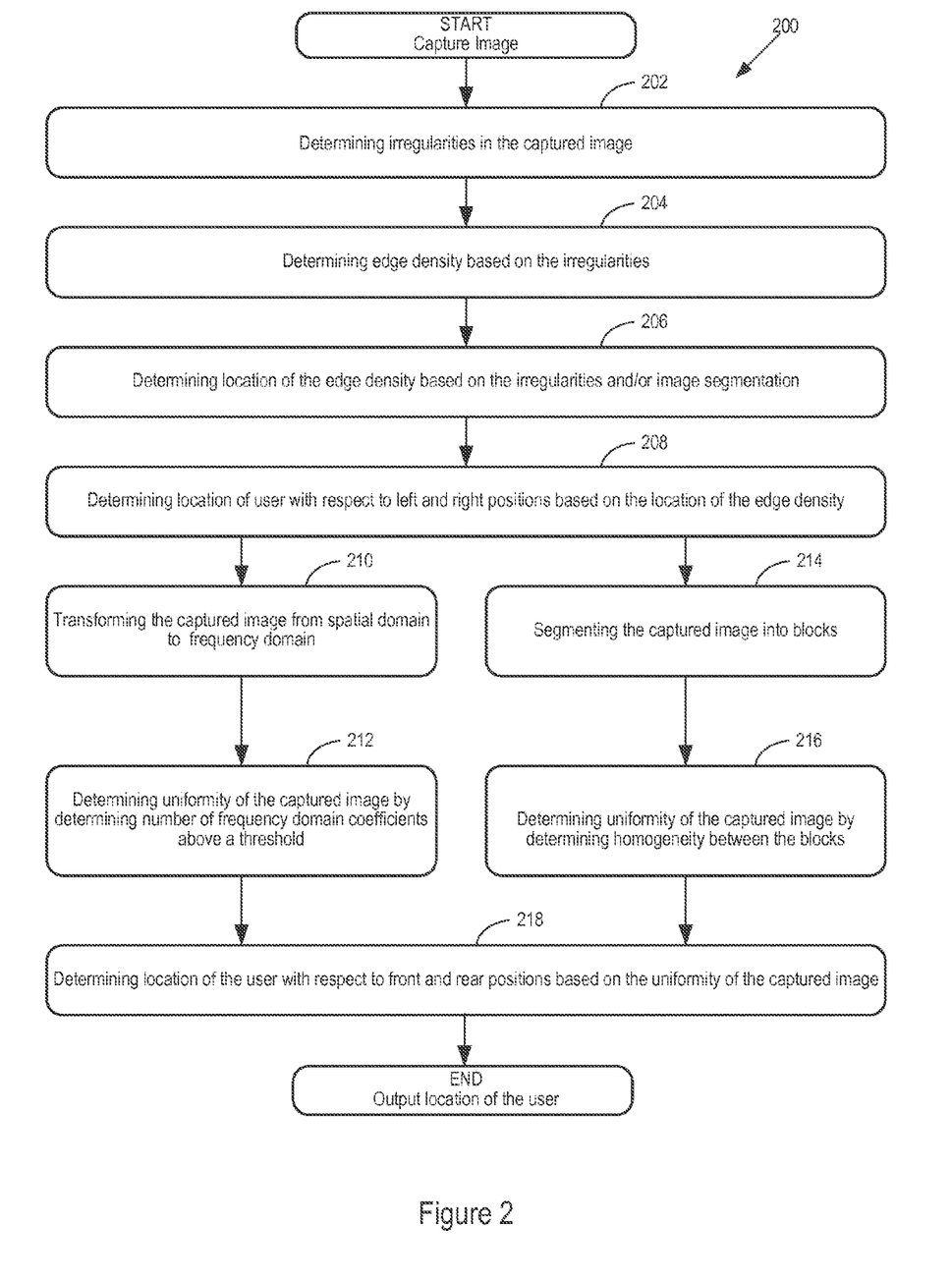
FIG. 2 illustrates an operational flowchart that can be performed by one or more aspects of an example ULS, such as the one or more aspects of the electronic device of FIG. 1.

FIG. 2 illustrates an operational flowchart 200 that can be performed by one or more aspects of one example of the ULS, such as one or more aspects of the electronic device 100. The flowchart 200 represents several sub-processes for edge detection, image segmentation, and image uniformity analysis. Through such sub-processes, the ULS may determine position of a user of a device, such as a smartphone, in an environment, such as in a vehicle.

For example, operation of the ULS may include edge detection in an image, such as a video or a still image, captured by one or more cameras of a mobile device. The edge detection may include use of edge detection operators, such as a Sobel operator, a Canny edge detector, a Roberts edge detector, and/or a Prewitt edge detector. In using an edge detection operator, an operator kernel size may be selected based at least on data size of a captured image.

Further, the operation of the ULS may include image segmentation based at least on the edge detection, for example. The image segmentation can be based at least on edge densities discovered in the captured image via the edge detection. The image segmentation is useful because further analysis or determinations can be run on a segment of an image instead of on an entire image, which may save processing and memory resources.

In addition to edge detection and image segmentation, the operation of the ULS may also include image uniformity analysis that may include frequency domain analysis of the captured image and/or entropy analysis of the captured image. Frequency domain analysis may include transforming the captured image from the spatial domain to a frequency domain using one or more transform operators, such as a fast Fourier transform (FFT), a discrete Fourier transform (DFT), a discrete cosine transform (DCT), a discrete sine transform (DST), and/or a discrete wavelet transform (DWT). Entropy analysis may include comparing differences, such as differences in brightness, between blocks, segments, or pixels of the captured image. As depicted in FIG. 2, for example, from the edge detection, the image segmentation, and the image uniformity analysis, position of a user may be determined. For example, seat position of a passenger in a vehicle may be determined.

In one example of the ULS, a processor (e.g., the processor 102) can execute processing device readable instructions encoded in memory (e.g., the memory 110). In such an example, the instructions encoded in memory may include a software aspect of the ULS, such as the ULS module 125. The example operation of the ULS may begin with a starting event, such as a camera of an electronic device capturing an image of the user of the electronic device. The image may contain the user and an environment behind and/or to one or more sides of the user.

Figure 4:
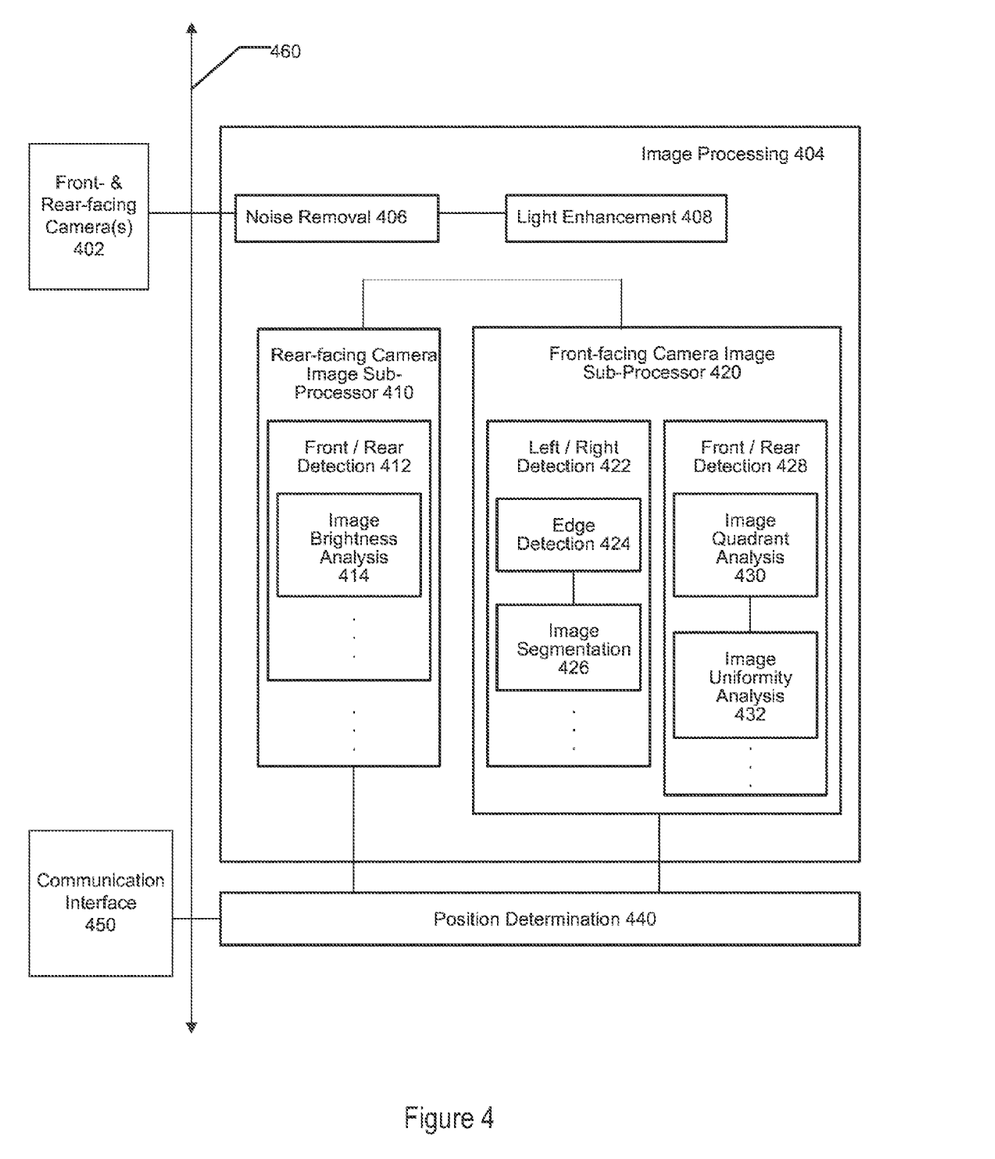
FIG. 4 illustrates example ULS modules, such as the ULS modules of the electronic device of FIG. 1.

At 202, the example operation may continue with an image processing aspect (such as a module of the ULS module 125 or an edge detection module 424 of FIG. 4) determining one or more irregularities in the captured image. For example, the image processing aspect may determine one or more irregularities in the environment behind and/or to one or more sides of the user. At 204, the image processing aspect may continue with determining an edge density. At 206, the image processing aspect may also determine location of the edge density based at least on the one or more irregularities. Also, at 206, using image segmentation, the image processing aspect may continue with determining location of the edge density. Image segmentation may occur by another image processing aspect (such as another module of the ULS module 125 or an image segmentation module 426 of FIG. 4).

At 208, the example operation may continue with another image processing aspect (such as another module of the ULS module 125 or a position determination module 440 of FIG. 4) determining location of the user with respect to left and right positions based at least on the location of the edge density.

At 210 and/or 214, the image uniformity analysis may begin. And from this analysis, a location determination processing aspect (such as the position determination module 440) may determine location of the user with respect to front and rear positions.

For example, at 210, the example operation may continue with an image processing aspect (such as a module of the ULS module 125 or an image uniformity analysis module 432 of FIG. 4) transforming the captured image from its spatial domain to a frequency domain. At 212, from the transformed image in the frequency domain, the image processing aspect may determine uniformity of the captured image by determining an amount of frequency domain coefficients above a threshold.

Also, for example, at 214, the example operation may continue with an image processing aspect (such as a module of the ULS module 125 or an image quadrant analysis module 430 of FIG. 4) segmenting the captured image into blocks. At 216, from the segmented image, an image processing aspect (such as a module of the ULS module 125 or the image uniformity analysis module 432 of FIG. 4) may determine uniformity of the captured image by determining homogeneity between the blocks.

At 218, the example operation may continue with an image processing aspect (such as another module of the ULS module 125 or the position determination module 440 of FIG. 4) determining location of the user with respect to front and/or rear positions based at least on the uniformity of the captured image. The example operation of the ULS may end with outputting the location of the user with respect to right, left, front, and/or rear positions. For example, the output can include whether the user is sitting in a front-right, front-left, rear-right, or rear-left seat of a vehicle. The outputted location information also may be relative location information with respect to other objects. The outputted location information may also be coordinates, such as Cartesian coordinates, polar coordinates, or homogeneous coordinates. This output can be used as input for various vehicle control devices, for example, such as a speed control device, a climate control device, or a stereo system. This output may be communicated to the vehicle control devices via a communication interface (such as the communication interface 120 or 450 of FIG. 1 or 4, respectively). For example, this output may be communicated to a head unit of a vehicle wirelessly or via a physical control bus.

Figure 3:
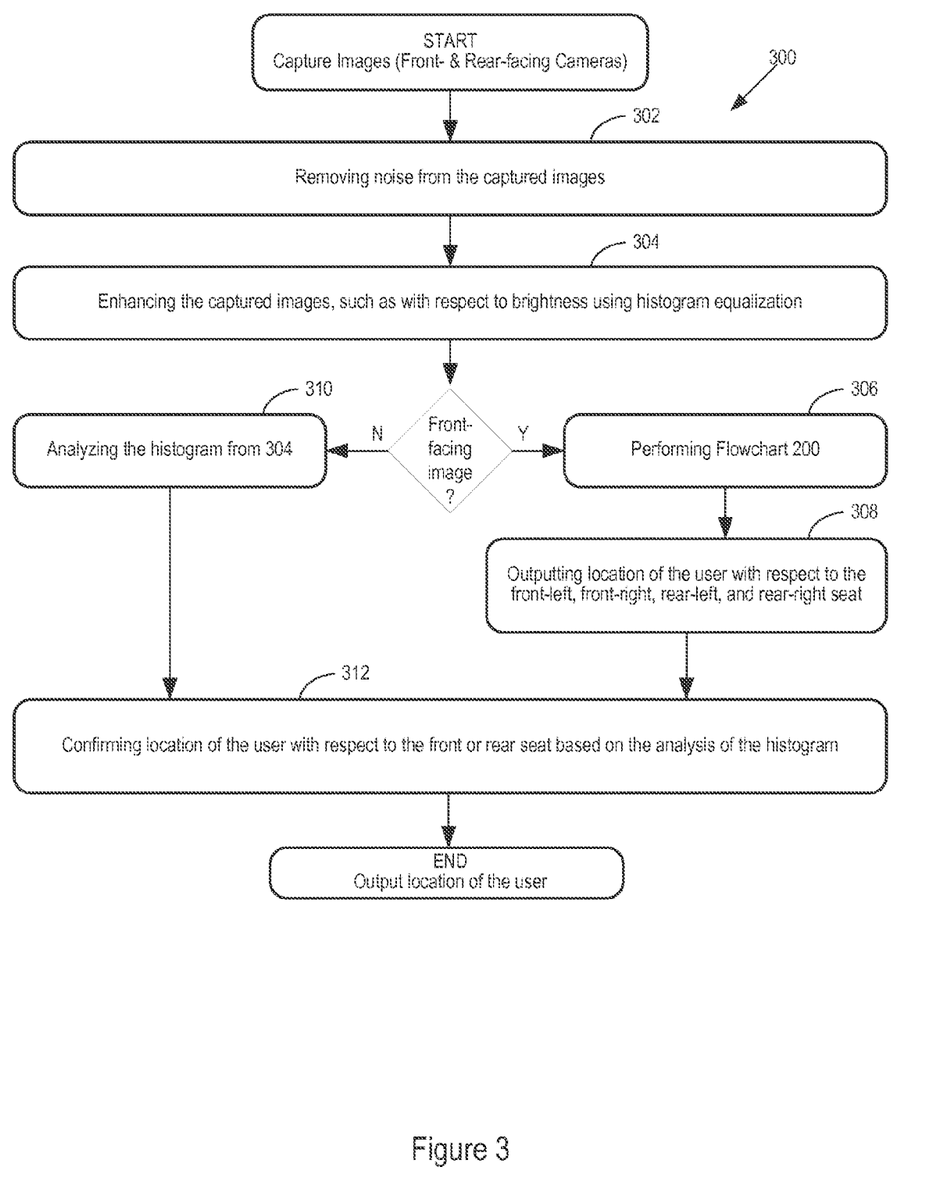
FIG. 3 illustrates another operational flowchart that can be performed by one or more aspects of an example ULS, such as the one or more aspects of the electronic device of FIG. 1.

FIG. 3 illustrates an operational flowchart 300 that can be performed by one or more aspects of one example of the ULS, such as one or more aspects of the electronic device 100. The flowchart 300 represents several sub-processes for image noise removal, image enhancement, histogram analysis, edge detection, image segmentation, and image uniformity analysis. Through such sub-processes, the ULS may determine position of a user of a device, such as a smartphone, in an environment, such as in a vehicle. Similar to the operational flowchart 200, the flowchart 300 may include similar edge detection, similar image segmentation based at least on the edge detection, and similar image uniformity analysis, to determine position of a user.

Regarding the flowcharts 200 and 300, the ULS may include one or more software aspects stored in storage devices of a mobile device of a user and a head unit of a vehicle, for example. The one or more software aspects may communicate via wireless technologies, such as one or more WI-FI or BLUETOOTH hardware or software technologies.

With respect to flowchart 300, a processor (e.g., the processor 102) can execute processing device readable instructions encoded in memory (e.g., the memory 110). In such an example, the instructions encoded in memory may include a software aspect of the ULS, such as the ULS module 125.

The example operation of the ULS may begin with a starting event, such as one or more cameras of an electronic device (e.g., the electronic device 100) providing front- and rear-facing images. The front- and rear-images may contain the user and an environment behind and/or to one or more sides of the user and an environment in front and/or to one or more sides of the user, respectively. In one example, the front-facing image may be captured by a front-facing camera (e.g., front-facing camera(s) 402 of FIG. 4) of an electronic device (such as a smartphone), and the rear-facing image may be captured by a rear-facing camera (e.g., rear-facing camera(s) 402 of FIG. 4) of the electronic device.

At 302, the example operation may continue with an image processing aspect (such as a module of the ULS module 125 or a noise removal module 406 of FIG. 4) removing noise from the captured front- and rear-images. At 304, the example operation may continue with another image processing aspect (such as another module of the ULS module 125 or a light enhancement module 408 of FIG. 4) enhancing the captured front- and rear-images, such as with respect to brightness using histogram equalization.

At 306, the example operation of the flowchart 300 may continue with processes of the example operational flowchart 200. At 308, the example operation may continue with an image processing aspect (such as a module of the ULS module 125 or the position determination module 440 of FIG. 4) outputting the location of the user with respect to the front-left, front-right, rear-left, or rear-right seat or position.

At 310, the example operation may continue with an image processing aspect (such as a module of the ULS module 125 or an image brightness analysis module 414 of FIG. 4) analyzing a histogram of the rear-facing image. And at 312, the example operation may continue with an image processing aspect confirming the outputted location of the user with respect to the front or rear position based at least on the analysis of the histogram of the rear-facing image. For example, a low light histogram reading may be indicative of the user being at a rear position of a vehicle.

Then, the example operation of the ULS may end with outputting the location of the user with respect to right, left, front, and/or rear positions. For example, the output can include whether the user is sitting in a front-right, front-left, rear-right, or rear-left seat of a vehicle. This output can be used, for example, as input for various vehicle control devices, such as a speed control device, a safety control device, a climate control device, or a stereo system, for example. Also, this output may be communicated to the vehicle control devices via a communication interface (such as the communication interface 120 or 450).

With respect to FIG. 4, illustrated are example ULS modules, such as the ULS aspects of the electronic device of FIG. 1, for example. Also, with respect to FIG. 1, the front- and rear-facing camera(s) 402 may be similar to camera(s) of the sensors 116 in communication with the electronic device 100. The bus 460 may be similar to the bus 110. The communication interface 450 may be similar to the communication interface 120. The image processing module 404, any module of the image processing module, and/or the position determination module 440 may be similar to one or more of the ULS module 125. Also, the modules 402, 404, 440, 450, and 460 may be components of the electronic device 100.

These example modules of FIG. 4 may facilitate aspects of the example operations described with respect to FIGS. 2 and 3.

As depicted, the image processing module 404 may include the noise removal module 406, the light enhancement module 408, a rear-facing camera image sub-processor 410, and a front-facing camera image sub-processor 420. The two sub-processors 410 and 420 may be operatively coupled with the position determination module 440. The position determination module 440 may be operatively coupled to the communication interface 450.

The front- and rear-facing camera(s) 402 may be operatively coupled to the noise removal module 406, the light enhancement module 408 (not depicted), the rear-facing camera image sub-processor 410 (coupling not depicted), and/or the front-facing camera image sub-processor 420 (coupling not depicted).

The rear-facing camera image sub-processor 410 may include a front/rear position detection module 412 that may include the image brightness analysis module 414. The image brightness analysis module 414 may receive a histogram as input from the light enhancement module 408.

The front-facing camera image sub-processor 420 may include a left/right position detection module 422 and a front/rear position detection module 428. The left/right position detection module 422 may include the edge detection module 424 and the image segmentation module 426. The front/rear position detection module 428 may include the image quadrant analysis module 430 and the image uniformity analysis module 432.

The edge detection module 424 may include edge operators, such as a Sobel operator, a Canny edge detector, a Roberts edge detector, or a Prewitt edge detector. The edge detection module 424 and/or the image segmentation module 426 may also include an operator kernel size selector. The edge detection module 424 and/or the image segmentation module 426 may also include an edge location analysis module and an edge density analysis module. The operator kernel size selector may optimize either of these modules because kernel size may be inversely proportional to computation power and directly proportional to edge detection accuracy.

The image uniformity analysis module 432 may include an entropy analysis module and a frequency domain analysis module that may include various transforms. The various transforms may include one or more FFTs, DFTs, DCTs, DSTs, and DWTs.

In one of the many examples of the ULS, once a person enters a vehicle or living space, a person's mobile device, such as a smartphone or handheld computer, may automatically synchronize with a head unit of the vehicle or set-top box of the living space. These devices may pair automatically and may communicate signals, including audio signals, using a wireless communication technology, such as BLUETOOTH or WI-FI. The mobile device that captures a location of the person, may communicate the location to the head unit or set-top box that may control and/or process the audio signal outputted to the loudspeakers, where the control and/or processing of the signal may at least be based at least on the location of the person. In this example, besides determining location from one or more cameras of the mobile device, such as a front-facing and/or rear-facing camera of a handheld, location may be confirmed from communication between the mobile device and the head unit or set-top box.

In short, there may be boundless applications and implementations of the ULS, including applications well beyond use of the ULS in a vehicle or a living space. The ULS can be applied to any other type of electronic device, including any devices with sensors, cameras, speakers, and modules capable of identifying user location and adjusting audio output, climate including temperature, and other environmental conditions with respect to the user's location.

Additionally or alternatively, a method of the system may include determining, via a processor, an edge density from one or more images of an environment. The one or more images may be provided from an electronic device of a user in the environment, and the determining of the edge density in the one or more images may be based at least on a Sobel operator, a Canny edge detector, a Roberts edge detector, a Prewitt edge detector, or any combination thereof. The method may also include determining, via the processor, a location of the edge density. The determining of the location of the edge density may be based at least on one or more irregularities in the one or more images. The determining of the location of the edge density may also be based at least on image segmentation. The method may also include determining, via the processor, a location of the user in the environment based at least on the determined location of the edge density.

The method may also include determining, via the processor, uniformity of the one or more images. The method may also include determining further, via the processor, the location of the user in the environment based at least on the determined uniformity of the one or more images.

The method may also include outputting, via an interface communicatively coupled to the processor, the determined location of the user in the environment. The outputting of the determined location may be communicated to a control device of the environment.

The method may also include removing, via the processor, noise from the one or more images. The method may also include enhancing, via the processor, the one or more images using histogram equalization. The enhancing of the one or more images may be with respect to brightness of the one or more images. The method may also include analyzing, via the processor, with respect to brightness, a histogram of the histogram equalization. The method may also include confirming, via the processor, the determined location of the user in the environment based at least on the analysis of the histogram. The environment may be a cabin of a vehicle. The determined location of the user in the environment may include a seat position of the vehicle.

The method may also include determining, via the processor, an image of the one or more images is captured by a rear-facing camera of the electronic device.

The method may also include transforming, via the processor, the one or more images from a spatial domain to a frequency domain. The determining of the uniformity of the one or more images may be based at least on the one or more transformed images. The determining of the uniformity of the one or more images may also be based at least on an amount of frequency domain coefficients over a threshold of the one or more transformed images.

The method may also include segmenting, via the processor, the one or more images into blocks. Also, the method may include analyzing, via the processor, the blocks, and determining, via the processor, the uniformity of the one or more images based at least on the analysis of the blocks. The analysis of the blocks may be based at least on entropy of the blocks. The entropy of the blocks may be one or more differences of neighboring blocks. The analysis of the blocks may also be based at least on homogeneity of the blocks.

Also, the system may include a processor, processor executable instructions stored in memory, and an interface. The instructions may be executable to determine an edge density and an edge density location in one or more images of a vehicle. The determining of the location of the edge density may be based at least on image segmentation. The instructions may also be executable to determine a location of a passenger in the vehicle based at least on the determined edge density and the determined edge density location. The instructions may also be executable to determine uniformity of the one or more images using one or more of an entropy calculation or a transformation of the one or more images from a spatial domain to a frequency domain. The instructions may also be executable to determine further the location of the passenger based at least on the determined uniformity of the one or more images. The interface may be operable to output to a control device of the vehicle, the determined location of the passenger.

Also, associated with the system, a computer readable medium may include instructions executable to determine an edge density and an edge density location in a front-facing image of a user of an electronic device. The front-facing image may be be provided by the electronic device. The instructions may also be executable to determine a location of the user based at least on the determined edge density and the determined edge density location. The instructions may also be executable to determine uniformity of the front-facing image using one or more of an entropy calculation or a transformation of the front-facing image from a spatial domain to a frequency domain. The instructions may also be executable to determine further the location of the user based at least on the determined uniformity of the front-facing image. The instructions may also be executable to confirm the location of the user based at least on brightness of a rear-facing image, the rear-facing image provided by the electronic device.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method, comprising:
    determining, via a processor, an edge density from one or more images of an environment, the one or more images provided from an electronic device of a user in the environment;
    determining, via the processor, a location of the edge density;
    determining, via the processor, a location of the user in the environment based at least on the determined location of the edge density;
    determining, via the processor, uniformity of the one or more images;
    determining further, via the processor, the location of the user in the environment based at least on the determined uniformity of the one or more images; and
    outputting, via an interface communicatively coupled to the processor, to a control device of the environment, the determined location of the user in the environment.

2. The method of claim 1, where the determining of the location of the edge density is based at least on one or more irregularities in the one or more images.

3. The method of claim 1, where the determining of the location of the edge density is based at least on image segmentation.

4. The method of claim 1, comprising removing, via the processor, noise from the one or more images.

5. The method of claim 1, comprising enhancing, via the processor, the one or more images using histogram equalization.

6. The method of claim 5, where the enhancing of the one or more images is with respect to brightness of the one or more images.

7. The method of claim 6, comprising determining, via the processor, an image of the one or more images is captured by a rear-facing camera of the electronic device.

8. The method of claim 7, comprising analyzing, via the processor, with respect to brightness, a histogram of the histogram equalization.

9. The method of claim 8, comprising confirming, via the processor, the determined location of the user in the environment based at least on the analysis of the histogram.

10. The method of claim 1, where the environment is a cabin of a vehicle.

11. The method of claim 10, where the determined location of the user in the environment includes a seat position of the vehicle.

12. The method of claim 1, comprising transforming, via the processor, the one or more images from a spatial domain to a frequency domain, where the determining of the uniformity of the one or more images is based at least on the one or more transformed images.

13. The method of claim 12, where the determining of the uniformity of the one or more images is based at least on an amount of frequency domain coefficients over a threshold of the one or more transformed images.

14. The method of claim 1, comprising: segmenting, via the processor, the one or more images into blocks; analyzing, via the processor, the blocks; and determining, via the processor, the uniformity of the one or more images based at least on the analysis of the blocks.

15. The method of claim 14, where the analysis of the blocks is based at least on entropy of the blocks, the entropy of the blocks being one or more differences of neighboring blocks.

16. The method of claim 14, where the analysis of the blocks is based at least on homogeneity of the blocks.

17. The method of claim 1, where the determining of the edge density in the one or more images is based at least on a Sobel operator, a Canny edge detector, a Roberts edge detector, a Prewitt edge detector, or any combination thereof.

18. A system, comprising:
a processor;
processor executable instructions stored in memory executable to:
determine an edge density and an edge density location in one or more images of a vehicle;
determine a location of a passenger in the vehicle based at least on the determined edge density and the determined edge density location; and
determine uniformity of the one or more images using one or more of an entropy calculation or a transformation of the one or more images from a spatial domain to a frequency domain; and
determine further the location of the passenger based at least on the determined uniformity of the one or more images; and
an interface operable to output to a control device of the vehicle, the determined location of the passenger.

19. The system of claim 18, where the determining of the location of the edge density is based at least on image segmentation.

20. A computer readable medium comprising instructions, the instructions executable to:
determine an edge density and an edge density location in a front-facing image of a user of an electronic device, the front-facing image provided by the electronic device;
determine a location of the user based at least on the determined edge density and the determined edge density location;
determine uniformity of the front-facing image using one or more of an entropy calculation or a transformation of the front-facing image from a spatial domain to a frequency domain;
determine the location of the user based at least on the determined uniformity of the front-facing image; and
confirm the location of the user based at least on brightness of a rear-facing image, the rear-facing image provided by the electronic device.

* * * * *